US012669352B2

(12) United States Patent
Ding et al.

(10) Patent No.: US 12,669,352 B2
(45) Date of Patent: Jun. 30, 2026

(54) TREEEVENTID A SYSTEM FOR ACCURATE TREE HAZARD DETECTION ON AERIAL TELECOM CABLES USING DISTRIBUTED FIBER SENSING AND NOVEL INFONCE-BASED LEARNING

(71) Applicant: NEC Laboratories America, Inc., Princeton, NJ (US)

(72) Inventors: Yangmin Ding, East Brunswick, NJ (US); Sarper Ozharar, Pennington, NJ (US); Zhuocheng Jiang, Plainsboro, NJ (US); Yue Tian, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 18/901,783

(22) Filed: Sep. 30, 2024

(65) Prior Publication Data

US 2025/0130074 A1      Apr. 24, 2025

Related U.S. Application Data

(60) Provisional application No. 63/592,689, filed on Oct. 24, 2023.

(51) Int. Cl.
*G01D 5/353* (2006.01)

(52) U.S. Cl.
CPC ............................... *G01D 5/35358* (2013.01)

(58) Field of Classification Search
CPC ........................... G01D 5/35358; G01H 9/004
See application file for complete search history.

(56) References Cited

U.S. PATENT DOCUMENTS 11,428,570 B2 * 8/2022 Tian ...................... G02B 6/4422
2018/0357542 A1 * 12/2018 Wu ........................... G06N 3/08

* cited by examiner

*Primary Examiner* — Seung C Sohn
(74) *Attorney, Agent, or Firm* — Vincent Duffy

(57) ABSTRACT

Disclosed are systems, methods, and structures that employ distributed fiber sensing that utilizes existing fiber cables for detecting tree events. Our inventive systems and methods can detect when a tree or other types of vibration occur on the telecom cable or poles, creating a high-resolution spatial profile of the cable. Systems and methods according to aspects of the present disclosure distinguish between tree events and other vibrations, such as hammer strikes on a utility pole, by employing Information Noise Contrastive Estimation (InfoNCE) and contrastive learning. Our inventive approach accurately differentiates between different types of vibrations and identifies patterns specific to tree events.

7 Claims, 9 Drawing Sheets

DAC: Digital-to-analog converter
ADC: Analog-to-digital converter
DSP: Digital signal processing
WDM: Wavelength division multiplexer
BPF: Band-pass filter
LPF: Low-pass filter

Step 3: Apply InfoNCE Similarity Measure

*FIG. 4*

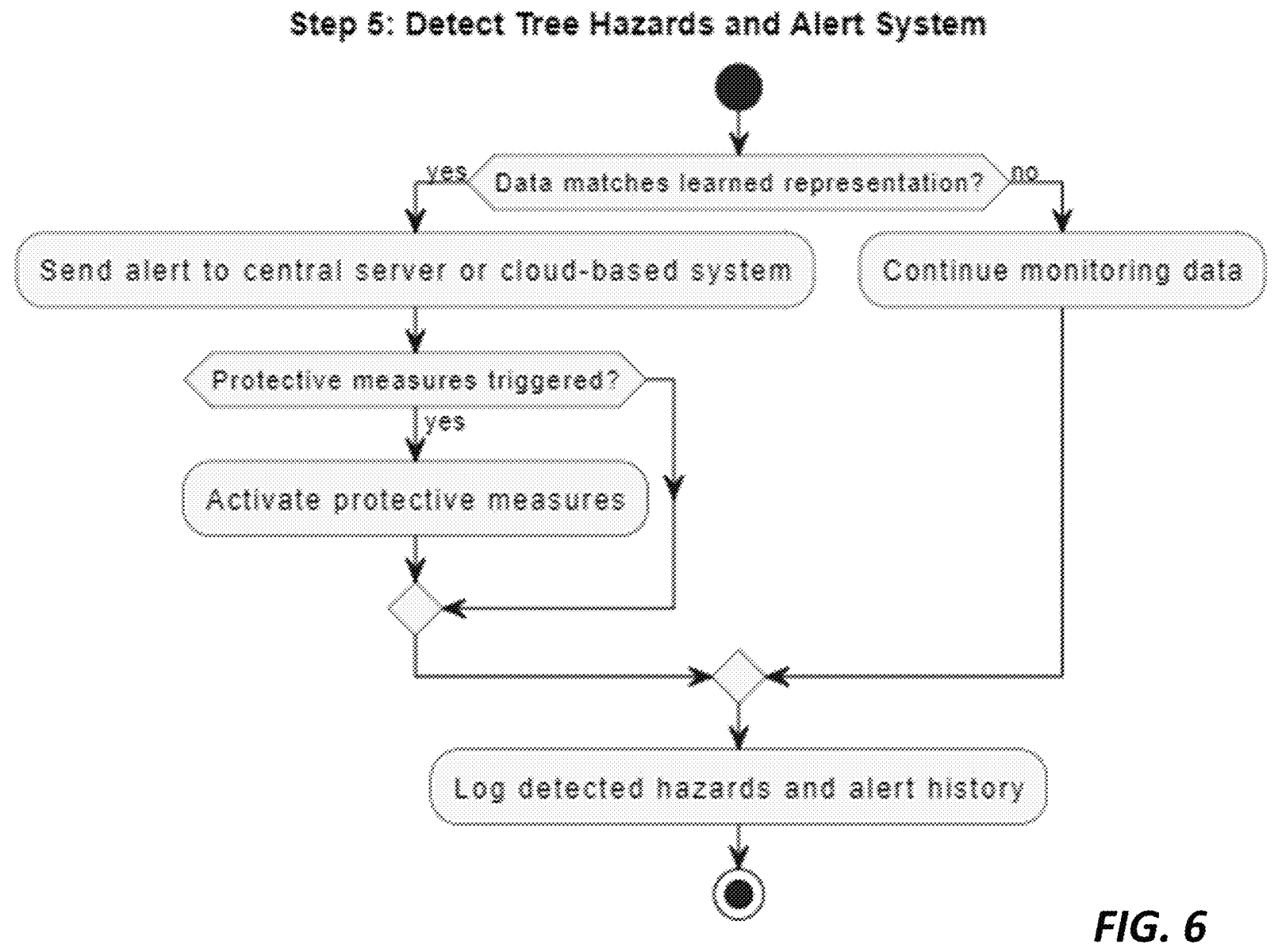

Step 5: Detect Tree Hazards and Alert System

Continue monitoring data

Data matches learned representation?

Send alert to central server or cloud-based system

Protective measures triggered?

Activate protective measures

Log detected hazards and alert history

*FIG. 6*

Step 6: Continuous Monitoring and Updating

TREEEVENTID A SYSTEM FOR ACCURATE TREE HAZARD DETECTION ON AERIAL TELECOM CABLES USING DISTRIBUTED FIBER SENSING AND NOVEL INFONCE-BASED LEARNING

CROSS-REFERENCE TO RELATED APPLICATIONS

This application claims the benefit of U.S. Provisional Patent Application Ser. No. 63/592,689 filed Oct. 24, 2023, the entire contents of which is incorporated by reference as if set forth at length herein.

FIELD OF THE INVENTION

This application relates generally to distributed fiber optic sensing (DFOS) systems, methods, structures, and related technologies. More particularly, it pertains to the accurate tree hazard detection on aerial telecom cables using distributed fiber sensing and novel InfoNCE-based learning.

BACKGROUND OF THE INVENTION

Distributed fiber optic sensing (DFOS) systems, methods, and structures have found widespread utility in contemporary industry and society. The present invention and disclosure provide a DFOS arrangement and method that advantageously detects tree hazards that pose a significant threat to aerial telecommunications cables with fallen trees or branches. Existing methods and systems for detecting tree hazards, such as point sensors or drones, have limitations in terms of their coverage area and time constraints.

SUMMARY OF THE INVENTION

An advance in the art is made according to aspects of the present disclosure directed to systems, methods, and structures that employ distributed fiber sensing that utilizes existing fiber cables for detecting tree events. Our inventive systems and methods can detect when a tree or other types of vibration occur on the telecom cable or poles, creating a high-resolution spatial profile of the cable.

In sharp contrast to the prior art, systems and methods according to aspects of the present disclosure distinguish between tree events and other vibrations, such as hammer strikes on a utility pole, by employing Information Noise Contrastive Estimation (InfoNCE) and contrastive learning. As we shall show and describe, our inventive approach accurately differentiates between different types of vibrations and identifies patterns specific to tree events.

BRIEF DESCRIPTION OF THE DRAWING

FIG. 4 is a schematic flow diagram showing an illustrative application of InfoNCE similarity measure operation according to aspects of the present disclosure.

FIG. 6 is a schematic flow diagram showing an illustrative detection of tree hazards and alert system operation according to aspects of the present disclosure.

DETAILED DESCRIPTION OF THE INVENTION

Figure 1A:
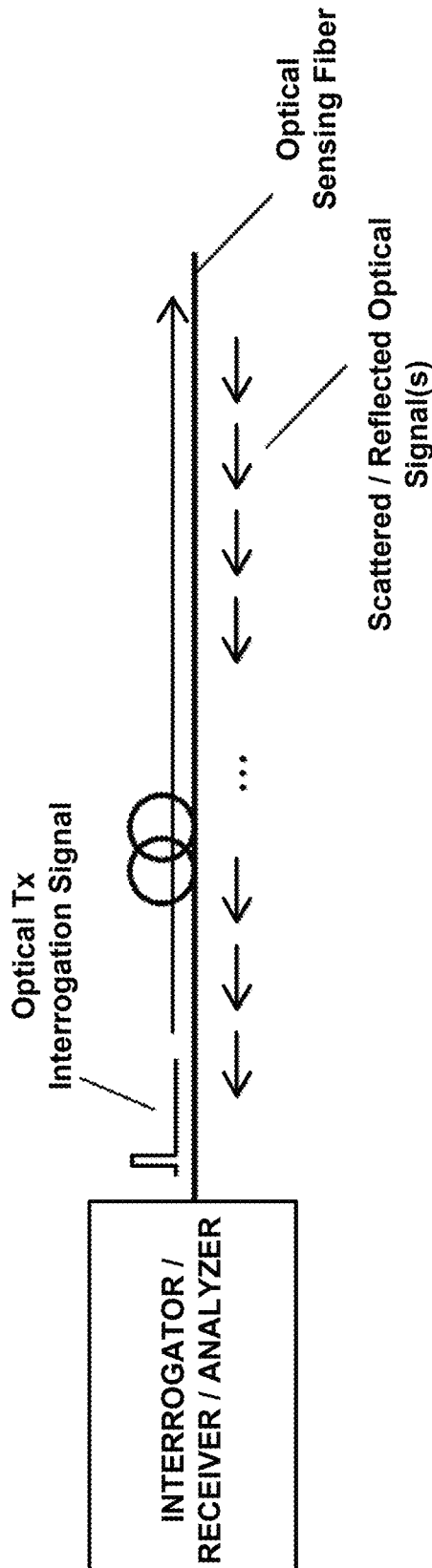
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems convert the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
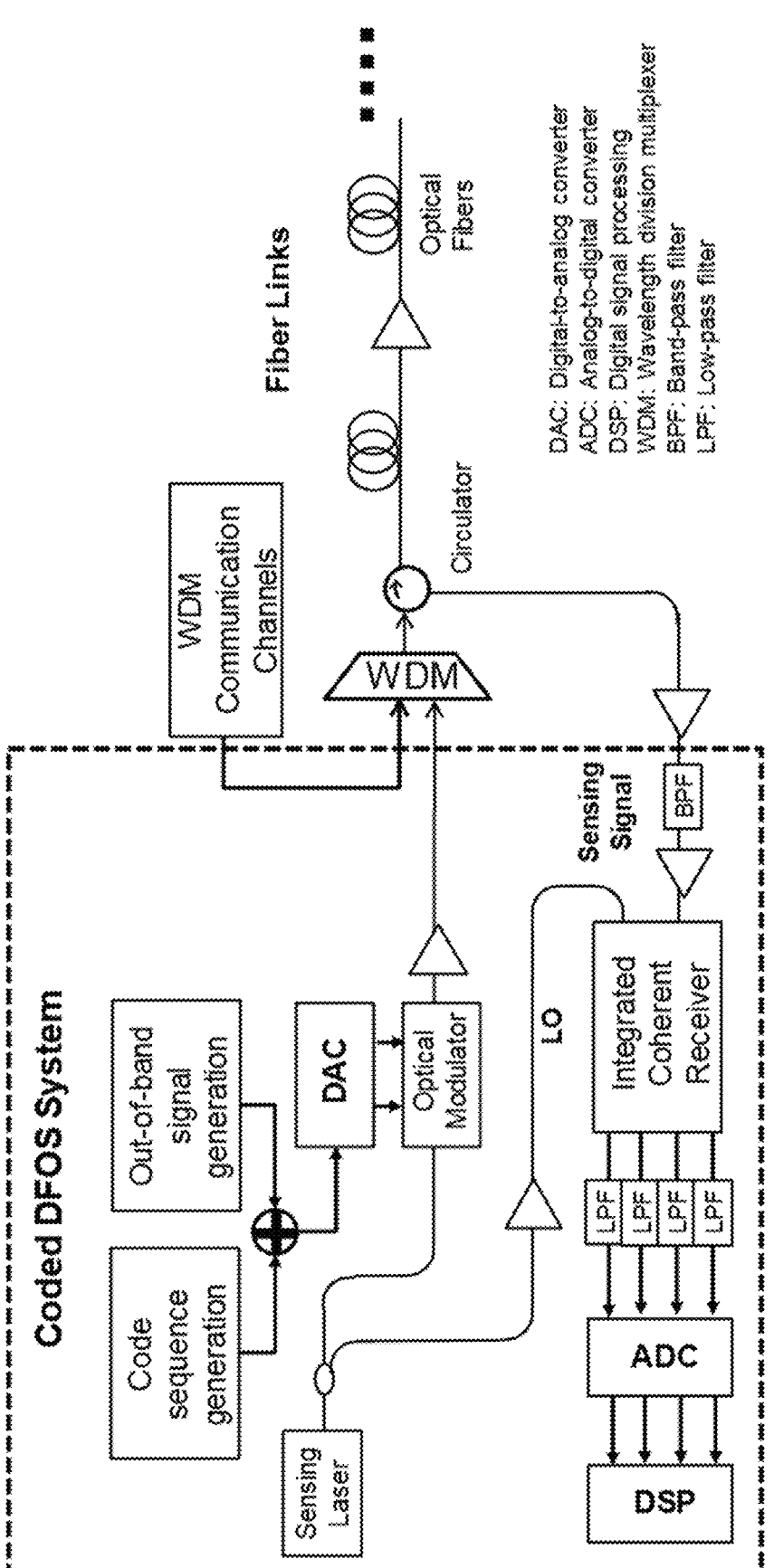

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Of particular interest, distributed acoustic sensing (DAS) is a technology that uses fiber optic cables as linear acoustic sensors. Unlike traditional point sensors, which measure acoustic vibrations at discrete locations, DAS can provide a continuous acoustic/vibration profile along the entire length of the cable. This makes it ideal for applications where it's important to monitor acoustic/vibration changes over a large area or distance.

Distributed acoustic sensing/distributed vibration sensing (DAS/DVS), also sometimes known as just distributed acoustic sensing (DAS), is a technology that uses optical fibers as widespread vibration and acoustic wave detectors. Like distributed temperature sensing (DTS), DVS allows for continuous monitoring over long distances, but instead of measuring temperature, it measures vibrations and sounds along the fiber.

DVS operates as follows.

Light pulses are sent through the fiber optic sensor cable.

As the light travels through the cable, vibrations and sounds cause the fiber to stretch and contract slightly.

These tiny changes in the fiber's length affect how the light interacts with the material, causing a shift in the backscattered light's frequency.

By analyzing the frequency shift of the backscattered light, the DAS/DVS system can determine the location and intensity of the vibrations or sounds along the fiber optic cable.

Similar to DTS, DAS/DVS offers several advantages over traditional point-based vibration sensors: High spatial resolution: It can measure vibrations with high granularity, pinpointing the exact location of the source along the cable; Long distances: It can monitor vibrations over large areas, covering several kilometers with a single fiber optic sensor cable; Continuous monitoring: It provides a continuous picture of vibration activity, allowing for better detection of anomalies and trends; Immune to electromagnetic interference (EMI): Fiber optic cables are not affected by electrical noise, making them suitable for use in environments with strong electromagnetic fields.

DAS/DVS technology has a wide range of applications, including: Structural health monitoring: Monitoring bridges, buildings, and other structures for damage or safety concerns; Pipeline monitoring: Detecting leaks, blockages, and other anomalies in pipelines for oil, gas, and other fluids; Perimeter security: Detecting intrusions and other activities along fences, pipelines, or other borders; Geophysics: Studying seismic activity, landslides, and other geological phenomena; and Machine health monitoring: Monitoring the health of machinery by detecting abnormal vibrations indicative of potential problems.

As the technology continues to develop, DAS/DVS is expected to become even more widely used in various fields where continuous and sensitive acoustic/vibration monitoring is crucial.

With the above in mind, we note that distributed fiber optical sensing techniques can detect vibrations on the optical cable when a tree or other types of vibration occurs on optical telecommunications cable or poles, creating a high-resolution spatial profile of the optical cable. This is achieved by using the fiber optic cable as a sensing element, which, as we have noted, can detect changes in temperature, strain, and acoustic signals along its length. These changes are then analyzed to detect any anomalous events, such as trees or branches falling on the cable.

To distinguish between tree events and other vibrations, such as hammer hits on the pole or small animals running on the cable, the present invention proposes a novel approach utilizing InfoNCE and contrastive learning. InfoNCE is a self-supervised learning method that measures the similarity between two sets of data. In the proposed invention, InfoNCE is used to compare the vibration patterns of the cable during tree events with those during other types of vibrations. This allows the system to identify patterns specific to tree events, even when they occur in the presence of other vibrations.

Contrastive learning is then used to learn representations of the vibration patterns that are specific to tree events. The system is trained on a large dataset of both tree and non-tree events, learning to distinguish between the two types of events based on the InfoNCE similarity measure. This approach allows the system to accurately differentiate between different types of vibrations and identify patterns specific to tree events Aspects of the present disclosure include the following.

5

6

Utilizing Existing Fiber Cables for Distributed Fiber Sensing

Systems and methods according to aspects of the present disclosure use existing fiber cables for distributed fiber sensing to detect tree events on aerial telecom cables. This approach allows for a cost-effective and efficient solution to detecting tree hazards without the need for additional equipment or sensors.

Novel Application of InfoNCE for Tree Event Identification

Systems and methods according to aspects of the present disclosure provide a novel approach utilizing InfoNCE for identifying tree events on aerial telecom cables. InfoNCE is used to compare the vibration patterns of the cable during tree events with those during other types of vibrations. This allows the system to identify patterns specific to tree events, even when they occur in the presence of other vibrations.

Contrastive Learning for Learning Representations of Tree Events

Systems and methods according to aspects of the present disclosure use contrastive learning for learning representations of vibration patterns specific to tree events. The system is trained on a large dataset of both tree and non-tree events, learning to distinguish between the two types of events based on the InfoNCE similarity measure. This approach allows the system to accurately differentiate between different types of vibrations and identify patterns specific to tree events.

High-Resolution Spatial Profile of Cable Vibration

Systems and methods according to aspects of the present disclosure offer a high-resolution spatial profile of cable vibration, allowing for the prediction of the intensity of tree events on aerial telecom cables. By analyzing the vibration patterns along the cable, the system can determine the location and intensity of tree events.

Integration with Telecom Infrastructure

Systems and methods according to aspects of the present disclosure can be integrated with existing telecom infrastructure, allowing for a seamless integration of the system with the existing network. This integration allows for real-time monitoring of the cable vibration and immediate response to tree events, improving the safety and reliability of the telecom infrastructure.

Figure 2:
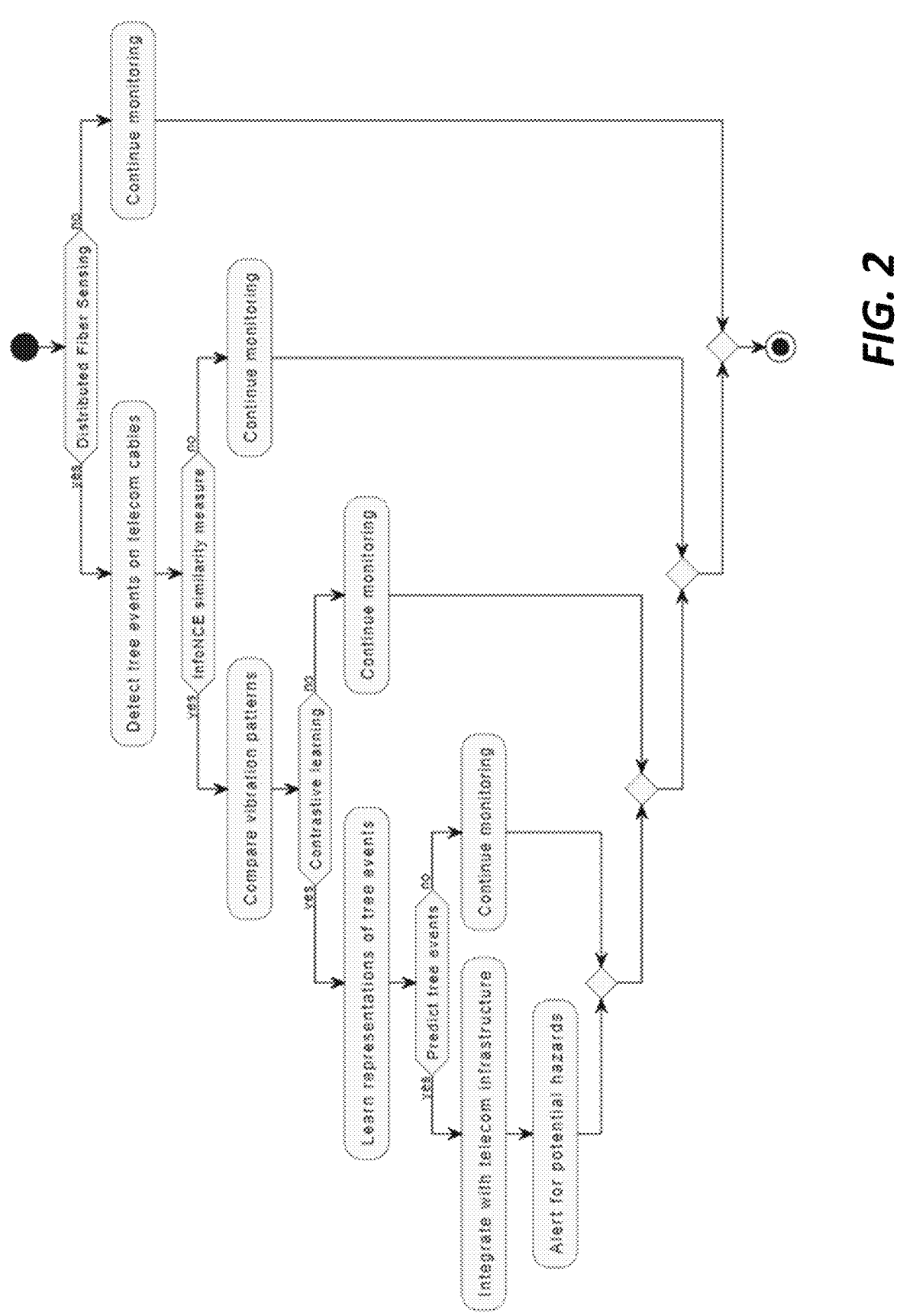
FIG. 2 is a schematic flow diagram showing an illustrative overall method operation according to aspects of the present disclosure.

FIG. 2 is a schematic flow diagram showing an illustrative overall method operation according to aspects of the present disclosure.

With reference to that—and the other figures, we note the following operational steps.

Step 1: Deploy Distributed Fiber Sensing System

This step involves the physical deployment of the distributed fiber sensing system along the aerial telecom cable infrastructure. The system utilizes existing fiber cables to detect vibrations along the cable, which can be used to detect potential tree hazards. The system is connected to a central server or cloud-based system, which receives and analyzes the data collected by the distributed fiber sensing system. The system can be designed to cover different lengths of cable, depending on the specific telecom infrastructure being monitored.

Figure 3:
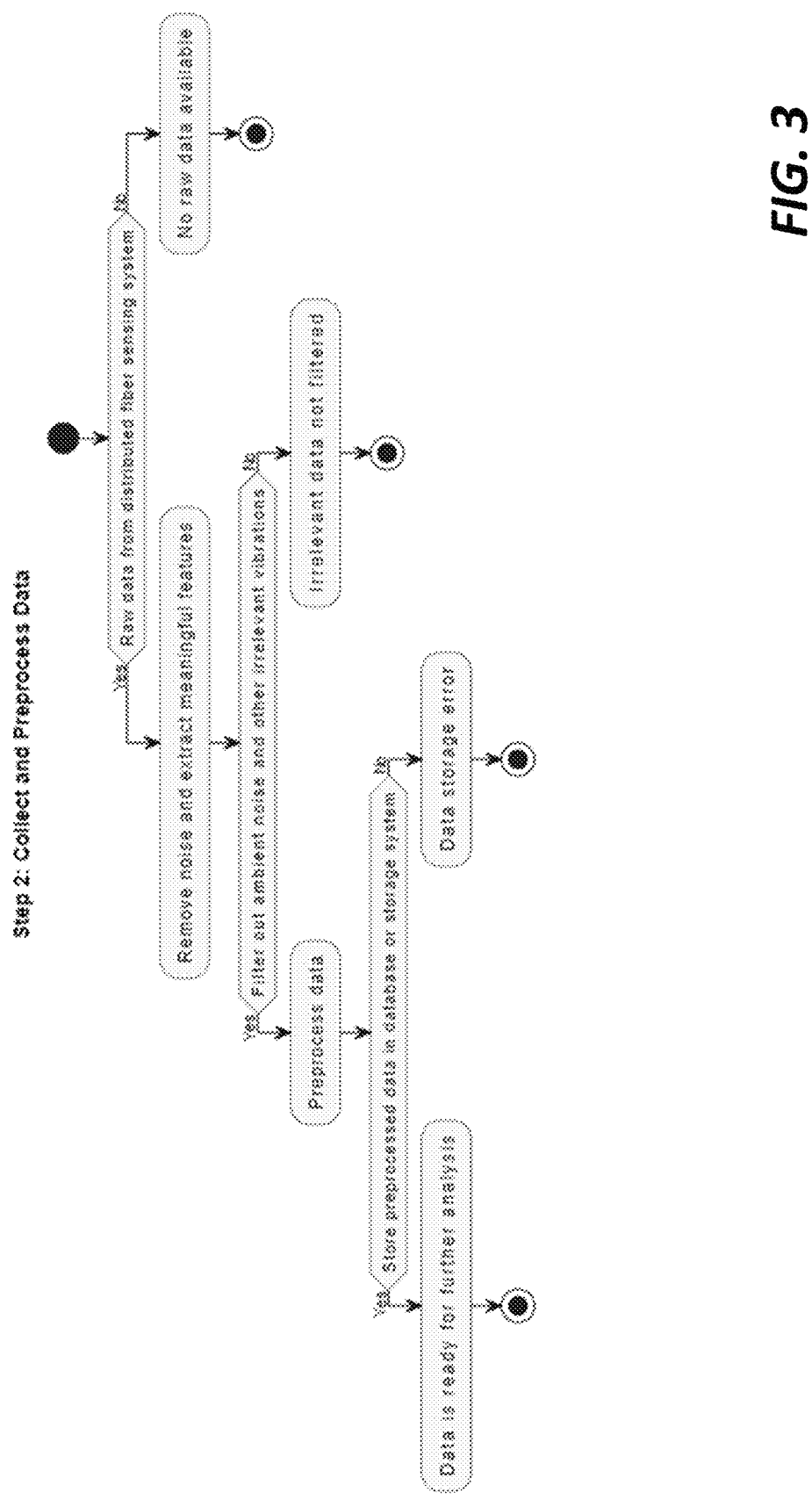
FIG. 3 is a schematic flow diagram showing an illustrative collection and preprocessing of data operation according to aspects of the present disclosure.

FIG. 3 is a schematic flow diagram showing an illustrative collection and preprocessing of data operation according to aspects of the present disclosure.

Step 2: Collect and Preprocess Data

Data collection is a critical step in the process of detecting tree hazards. In this step, raw data collected from the distributed fiber sensing system is preprocessed to remove noise and extract meaningful features. This includes filtering out ambient noise and other types of vibrations that are not relevant to detecting tree hazards. The preprocessed data is then stored in a database or other data storage system for further analysis. If the filtering and preprocessing steps are successful, the preprocessed data is ready for further analysis. However, if there are errors in storing the data, the process will stop with a data storage error message. Similarly, if there is no raw data available, the process will stop with a message indicating the lack of data.

Figure 4:
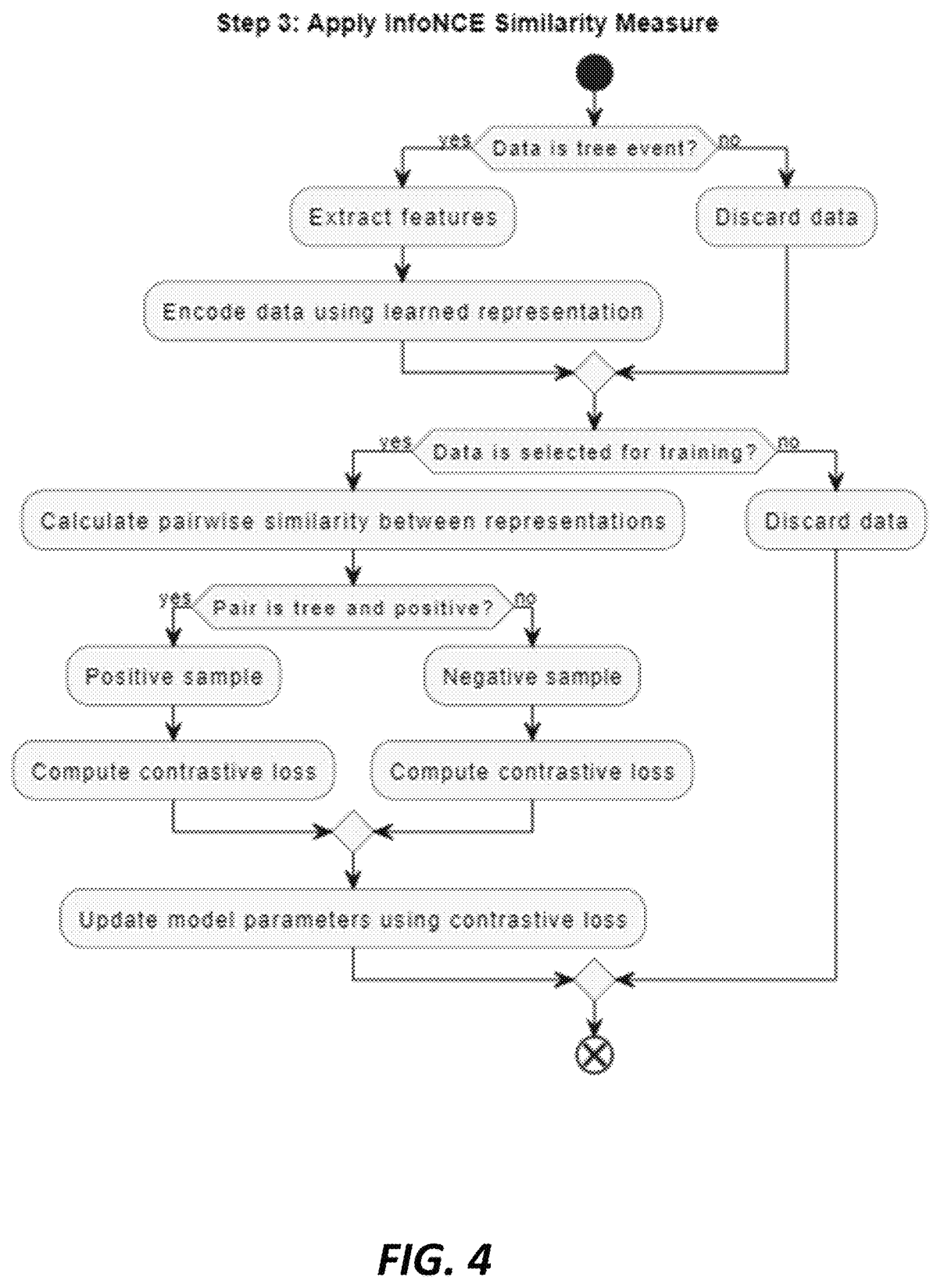

FIG. 4 is a schematic flow diagram showing an illustrative application of InfoNCE similarity measure operation according to aspects of the present disclosure.

Step 3: Apply InfoNCE Similarity Measure

InfoNCE is a self-supervised learning method that measures the similarity between two sets of data. In this step, InfoNCE is applied to compare the vibration patterns of the cable during tree events with those during other types of vibrations. This allows the system to identify patterns specific to tree events, even when they occur in the presence of other vibrations. The system is trained on a large dataset of both tree and non-tree events, learning to distinguish between the two types of events based on the InfoNCE similarity measure. After the data is encoded using learned representation, the system calculates the pairwise similarity between the representations of the data. If the pair of data is a tree event and is positive (meaning it is a valid tree event that needs to be detected), the system considers it a positive sample and computes the contrastive loss. If the pair is not a tree event, the system considers it a negative sample and also computes the contrastive loss. The model parameters are then updated using the contrastive loss. By using InfoNCE similarity measure and contrastive learning in this way, the system can effectively learn to distinguish between tree events and other types of vibrations, even in the presence of noise and other environmental factors.

Figure 5:
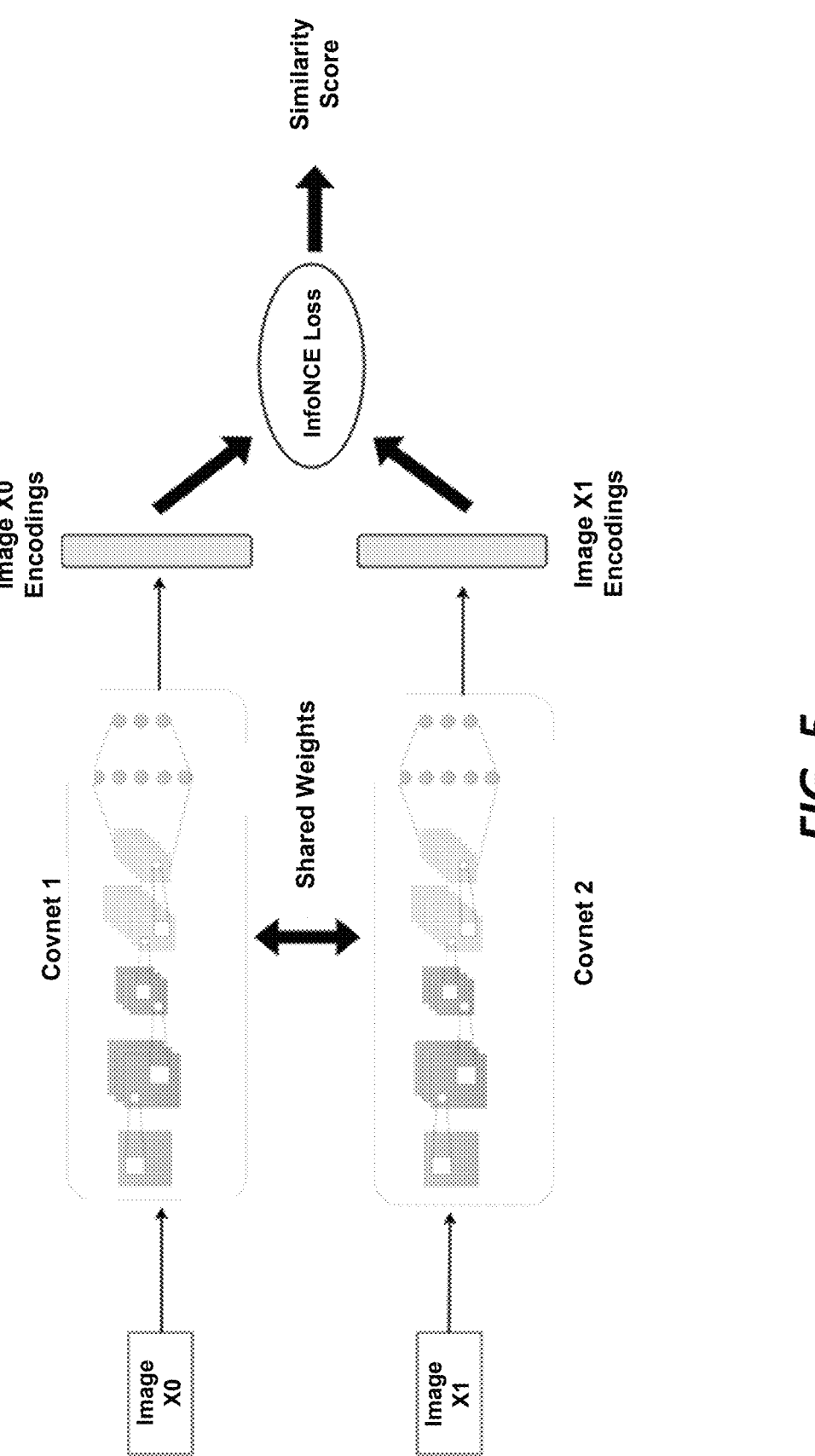
FIG. 5 is a schematic block diagram showing an illustrative framework architecture of a 2-dimensional convolutional neural network-based contrastive learning model according to aspects of the present disclosure.

FIG. 5 is a schematic block diagram showing an illustrative framework architecture of a 2-dimensional convolutional neural network-based contrastive learning model according to aspects of the present disclosure.

Step 4: Learn Representations of Tree Events Using Contrastive Learning

Contrastive learning is then used to learn representations of the vibration patterns that are specific to tree events. The preprocessed data from Step 2 is used as input for this step. The InfoNCE similarity measure is calculated for each data point to determine whether it is a tree event or not. If the data point is a tree event, the system extracts features and encodes the data using the learned representation from Step 3. The system then uses contrastive learning to learn representations of the vibration patterns that are specific to tree events. This involves training the system to identify similar patterns within the dataset and create a representation of tree events. The learned representation can be used to identify tree hazards in real-time. If the data point is not a tree event, it is discarded. Overall, Step 4 is focused on using contrastive learning to learn representations of tree events based on the InfoNCE similarity measure calculated in Step 3. This allows the system to accurately distinguish between different types of vibrations and identify patterns specific to tree events, improving the accuracy and reliability of tree hazard detection. The architecture of contrastive learning is presented as follows with reference to FIG. 5.

The framework comprises a 2-dimensional Convolutional Neural Network-based contrastive learning model, which enables identifying ambient and other abnormal types of events.

Note that $x_0$ and $x_1$ represent two inputs images to the CNN based contrastive learning model. There are two CNNs sharing the same weights ω, which contains 3 convolutional layers with Leaky ReLU activation function which is beneficial for speeding up training process, and 2 fully connected layers. After encoding input image X0 and X1 as $f_\omega(X0)$, $f_\omega(X1)$, InfoNCE is implemented as the loss function of contrastive learning framework. The InfoNCE loss uses categorical cross-entropy to identify positive sample among a set of unrelated noise samples by optimizing the negative log probability of classifying sample correctly:

$$L_{InfoNCE} = -E\left[\log\frac{f_\omega(x_0)}{\sum_{x_i \in X} f_\omega(x_i)}\right]$$

Where $$X = \{x_i\}_{i=0}^{N}$$

represents all the samples which only $x_0$ is a positive sample.

FIG. 6 is a schematic flow diagram showing an illustrative detection of tree hazards and alert system operation according to aspects of the present disclosure.

Step 5: Detect Tree Hazards and Alert System

The learned representation of tree events generated in Step 4 is used to detect potential tree hazards on the aerial telecom cable infrastructure. The system continuously monitors the preprocessed data from Step 2 for patterns that match the learned representation of tree events. When a potential tree hazard is detected, the system sends an alert to the central server or cloud-based system, which can then notify the relevant authorities or telecom operators. The alert can include information such as the location and severity of the hazard. The system can be designed to automatically trigger protective measures, such as shutting down power to the affected area or activating backup communication channels, based on the severity of the hazard. The system can also log the detected hazards and alert history for future analysis and optimization.

Figure 7:
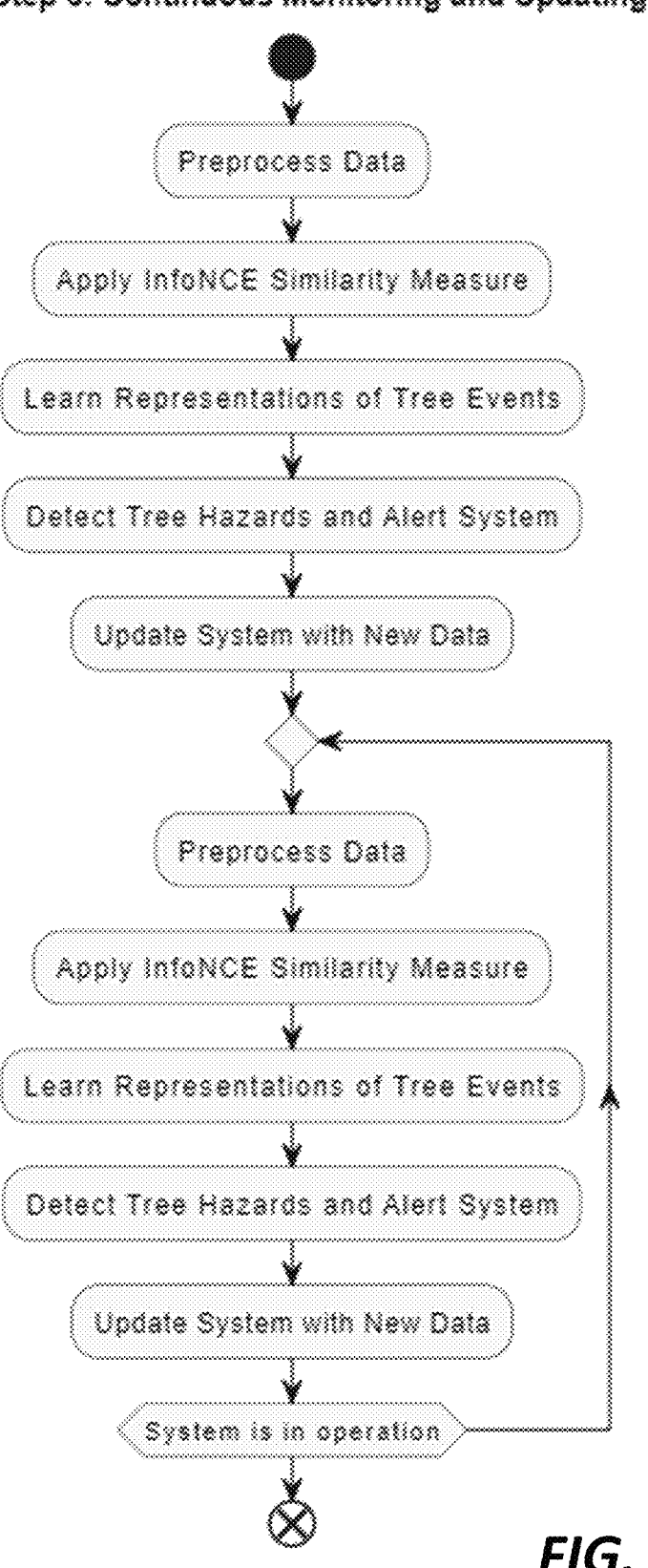
FIG. 7 is a schematic flow diagram showing an illustrative continuous monitoring and updating operation according to aspects of the present disclosure.

FIG. 7 is a schematic flow diagram showing an illustrative continuous monitoring and updating operation according to aspects of the present disclosure.

Step 6: Continuous Monitoring and Updating

In this step, the system continues to collect raw data from the distributed fiber sensing system. The raw data is preprocessed to remove noise and extract meaningful features. InfoNCE similarity measure is applied to compare the vibration patterns of the cable during tree events with those during other types of vibrations. This step helps the system to identify patterns specific to tree events, even when they occur in the presence of other vibrations.

Contrastive learning is used to learn representations of the vibration patterns that are specific to tree events. The system is trained on a large dataset of both tree and non-tree events, learning to distinguish between the two types of events based on the InfoNCE similarity measure. The learned representation of tree events is used to detect potential tree hazards along the aerial telecom cable infrastructure. When a tree hazard is detected, the system sends an alert to the central server or cloud-based system. The system is periodically updated with new data to improve the accuracy of the learned representation and detect new types of tree hazards. Steps 2 to 6 are repeated continuously to ensure the system remains effective in detecting tree hazards over time.

Continuous monitoring and updating is crucial for ensuring the system remains accurate and effective in detecting tree hazards. By periodically updating the system with new data, the learned representation can be improved and new types of tree hazards can be detected. The system operates in a loop, continuously collecting, preprocessing, analyzing, and detecting potential tree hazards along the aerial telecom cable infrastructure.

Figure 8:
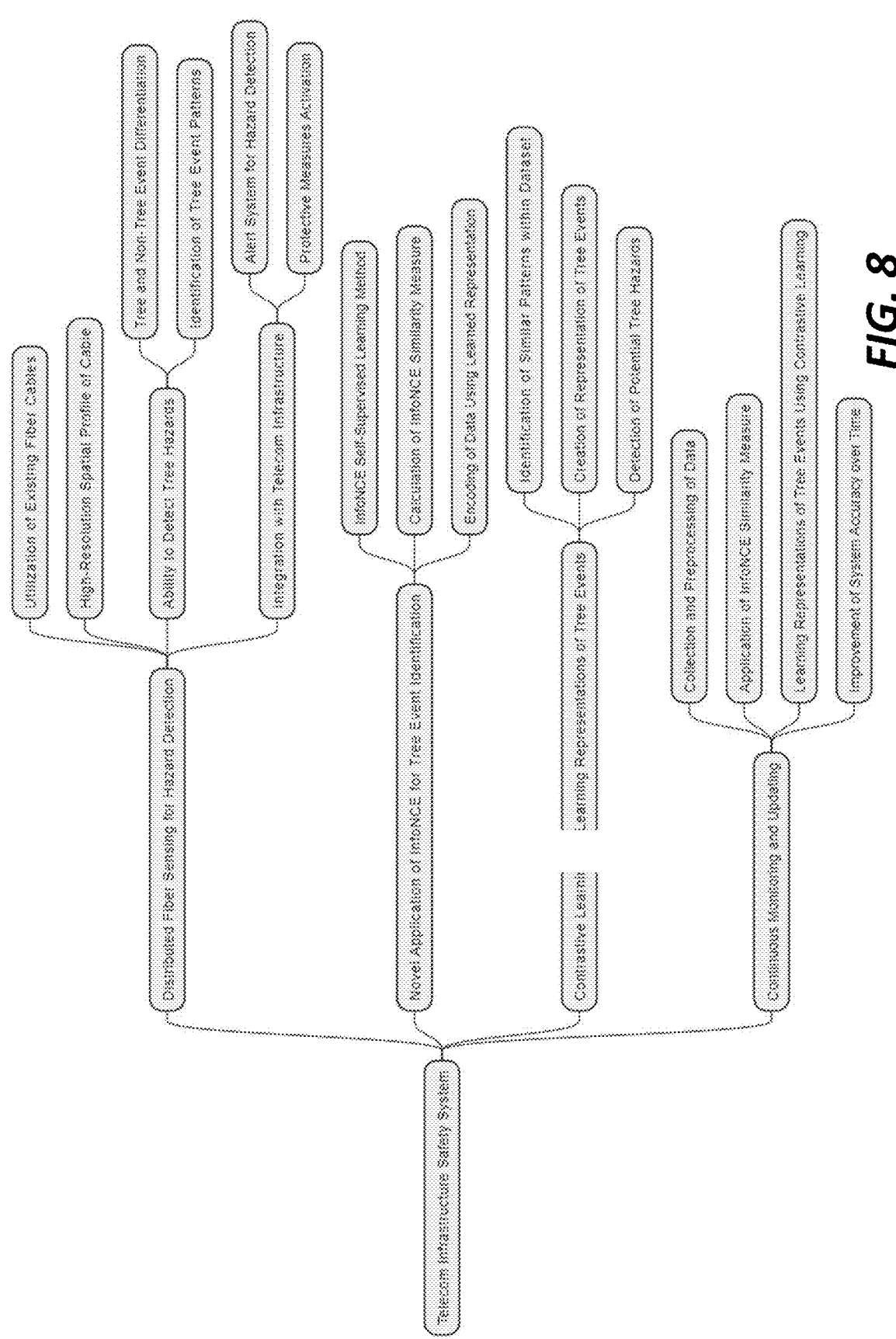
FIG. 8 is a schematic block diagram showing an illustrative feature diagram operation according to aspects of the present disclosure.

FIG. 8 is a schematic block diagram showing an illustrative feature diagram operation according to aspects of the present disclosure.

While we have presented our inventive concepts and description using specific examples, our invention is not so limited. Accordingly, the scope of our invention should be considered in view of the following claims.

The invention claimed is:

1. A distributed fiber optic sensing (DFOS) system for aerial cable, tree-hazard detection comprising:
   a DFOS system including:
      a DFOS interrogator; and
      a DFOS optical sensor fiber configured as an aerial cable;
   wherein the DFOS interrogator is configured to generate optical interrogator pulses, introduce the generated optical pulses into DFOS optical sensor fiber receive backscattered signals in response;
   the DFOS system CHARACTERIZED IN THAT:
      Information Noise Contrastive Estimation (InfoNCE) and contrastive learning is employed to distinguish tree events and other vibrations.

2. The system of claim 1 wherein the system is configured to employ the InfoNCE, a self-supervised learning, to measure similarity between tree event data and other vibration event data.

3. The system of claim 2 wherein the system is configured to employ contrastive learning to learn vibration patterns that are specific to tree events.

4. The system of claim 3, that is trained on a dataset of both tree and non-tree events such that it may distinguish between the tree and non-tree events based on InfoNCE similarity.

5. The system of claim 4 wherein the DFOS optical sensor fiber is part of an existing telecommunications infrastructure.

6. The system of claim 5 wherein the system is a central-server system or a cloud-based system.

7. The system of claim 6 wherein the contrastive learning is performed using a Convolutional Neural Network (CNN).

* * * * *